United States Patent [19]

Kambe et al.

[11] Patent Number: 4,472,369

[45] Date of Patent: Sep. 18, 1984

[54] PROCESS FOR PRODUCING FERRITES

[75] Inventors: Koichi Kambe, Yamada; Tsugunori Honda, Ichikawa; Toshio Toyota, Yamada; Mitsuharu Tominaga, Nagareyama; Koichi Yoshioka, Yamada, all of Japan

[73] Assignee: Japan Metals and Chemicals Co., Ltd., Tokyo, Japan

[21] Appl. No.: 463,298

[22] Filed: Feb. 2, 1983

[30] Foreign Application Priority Data

Feb. 10, 1982 [JP] Japan .................................. 57-20286

[51] Int. Cl.$^3$ ........................ C01G 49/00; C01G 45/00
[52] U.S. Cl. .................................. 423/594; 252/62.56; 252/62.62; 252/62.64
[58] Field of Search ....................... 423/594; 252/62.56

[56] References Cited

U.S. PATENT DOCUMENTS

| 2,551,711 | 5/1951 | Snoek et al. | 423/594 |
| 2,579,978 | 12/1951 | Snoek et al. | 423/594 |
| 2,645,700 | 7/1953 | Morin | 423/594 |
| 3,895,092 | 7/1975 | Sironi et al. | 423/594 |
| 3,896,216 | 7/1975 | Fagherazzi et al. | 423/594 |

Primary Examiner—Herbert T. Carter
Attorney, Agent, or Firm—Stevens, Davis, Miller & Mosher

[57] ABSTRACT

Ferrite having a uniform degree of oxidation is produced at a higher rate of ferrite forming reaction by pelletizing a mixture of iron oxide and ferromanganese powders and calcining the mixture at a temperature of 900° C. or higher. Zinc oxide, magnesium oxide and/or nickel oxide may be further added to the mixture, as required.

2 Claims, No Drawings

PROCESS FOR PRODUCING FERRITES

The present invention relates to a process for producing ferrites and, more particularly, to a process which can produce ferrites having an improved uniformity of oxidation at an improved rate of ferrite forming reaction.

Ferrites are extensively used in the high-frequency magnetic cores of televisions, radios and other communications equipment such as magnetic heads, transformers and CRT deflection yokes. Ferrite may also be used as an ingredient of paints for the prevention of radio wave interference.

Different ferrite compositions are used in such magnetic cores depending on the magnetic characteristics required for specific types of cores. Ferrites are composed mainly of iron oxide and manganese oxide or zinc oxide; to which magnesium oxide, nickel oxide or other oxide is added. The mixture of oxides is sintered so as to form a spinel structure represented by $MO.Fe_2O_3$, with M being a bivalent metallic element.

Typically, for commercial scale production of such ferrites, powders of the aforementioned component oxides are first mixed and pelletized, then the pellets are subjected to primary calcination in an oxidizing atmosphere. The calcined pellets are ground and then pelletized again. The resultant pellets are subjected to secondary calcination. In such a known process, however, the primary and secondary calcinations each require several hours of heating to bring about a ferrite forming reaction between the component oxides.

Accordingly, an object of the present invention is to provide an improved process for producing ferrites, which can produce ferrites having an improved uniformity of oxidation at a higher rate of ferrite forming reaction.

According to one feature of the present invention, a mixture of iron oxide powder and ferromanganese powder is pelletized and the resultant pellets are calcined for oxidization at a temperature of 900° C. or higher.

According to another feature of the present invention, a mixture of iron oxide powder, ferromanganese powder and at least one ingredient to be selected from the group consisting of zinc oxide, magnesium oxide and nickel oxide powders is pelletized and the resultant pellets are calcined for oxidization at a temperature of 900° C. or higher.

As is well known in the art, ferromanganese contains about 70 to 80 percent by weight of manganese (with the remaining part consisting mainly of iron), and it is used as a deoxidizing agent in steel production. When ferromanganese powder is calcined at a temperature of 900° C. or higher, its iron content is oxidized into FeO and $Fe_2O_3$, and the manganese content is oxidized into MnO and $Mn_2O_3$. However, when calcining ferromanganese powder, the powder particles are exposed to widely varying temperatures from one portion of the powder being heated to another portion thereof. Thus, since the degree of oxidation of iron and manganese depends greatly on the calcination temperature, it is difficult to obtain calcined powders having a uniformity of oxidation, so far as commercial scale production is concerned.

Further, when calcining a mixture of ferromanganese powder and metallic iron powder at a temperature of 900° C. or higher, the mixture may be partly melted, and a noticeable variation also occurs in the degree of oxidation.

In contrast, in the process of the present invention in which a mixture of iron oxide powder and ferromanganese oxide is pelletized, the mixture is not melted even when calcined by being heated at elevated temperatures above 900° C. Also, according to the present invention, ferromanganese is oxidized rapidly at a substantially uniform degree of oxidation throughout, while the ferrite forming reaction between the manganese oxide and iron oxide is accomplished in a shorter time as compared with the prior art processes.

Further according to the present invention, at least one ingredient to be selected from the group consisting of zinc oxide, magnesium oxide and nickel oxide may be added to the aforementioned mixture of iron oxide powder and ferromanganese powder as required to adjust the magnetic properties and other characteristics of the resultant ferrite to specific uses. These additional ingredients need not be in the form of metal oxides, but may be added as metal salts that produce metal oxides by calcination.

If desired, the ferrite containing such additional ingredients may be used as a raw material for other ferrites having different characteristics. That is the say, oxides of zinc, magnesium and/or iron may be further added thereto, and the resultant mixture after being molded to a desired shape is subjected to secondary calcination to obtain such other ferrite. Alternatively, the aforementioned ferrite may be used for various applications without being subjected to such secondary calcination. For example, it may be ground and added to paints.

Hereinafter the present invention will be described in greater detail by way of the preferred examples thereof.

EXAMPLE 1

Thirty-four parts by weight of ground ferromanganese having an average particle size of about 4.0 microns and containing 18.6 percent by weight of iron and 74.1 percent by weight of manganese were homogeneously mixed with 66 parts by weight of iron oxide powder having an average particle size of about 2 microns. As a binder, 0.1 part by weight of polyvinyl alcohol was added to the mixture to pelletize the same. The resultant pellet particles were about 8 mm across and about 8 mm long. The pellet was then placed in a tubular electric furnace and the furnace temperature was raised gradually from room temperature to about 1,100° C. over a period of about 2 hours. After maintaining this furnace temperature for an additional 1 hour, the pellet was taken out of the furnace and immediately put into water to be cooled therein. The aforesaid mixture was formulated so that its manganese content was proportioned to the iron content at an atomic weight ratio of 1:2. This atomic weight ratio was applied also to all the mixtures of the examples to be described hereinafter.

As reference example A, a homogeneous mixture of 36 parts by weight of electrolytic manganese dioxide containing 60 percent by weight of manganese (reagent grade 1 subject to the Japanese Pharmacopoeia, ground to an average particle size of about 5 microns) and 64 parts by weight of the same iron oxide as that used in the preceding example was pelletized and water-cooled under the same conditions as in the preceding example.

As reference example B, a homogeneous mixture of 57.5 parts by weight of metallic iron powder (reagent grade 1 subject to the Japanese Pharmacopoeia, ground to an average particle size of about 5 microns) and 42.5 parts by weight of the same ferromanganese powder as that used in the preceding example was pelletized and water-cooled under the same conditions as in the foregoing examples.

As reference example C, a homogeneous mixture of 45 parts by weight of the same electrolytic manganese dioxide as that used in the aforementioned reference example A and 55 parts by weight of the same metallic iron powder as that used in the preceding example B was pelletized and water-cooled under the same conditions as in the foregoing examples.

To determine how the ferrite forming reaction is promoted according to the present invention, the respective pellets of example 1 and reference examples A, B and C were subjected to powder X-ray diffractometry, the results of which are shown in the following table:

| Examples | Intensity at $d = 2.56$ Å | Intensity at $d = 2.69$ Å |
|---|---|---|
| Example 1 | 100 | 5 |
| Reference example A | 73 | 13 |
| Reference example B | 65 | 15 |
| Reference example C | 82 | 10 |

The peak intensity at $d=2.56$ Å, which is a main peak representing $MnFe_2O_4$, was selected as the reference intensity of 100 in the X-ray diffractometry of the ferrite product of the present invention, and relative intensities in the reference examples to the reference intensity and relative intensities thereto at $d=2.69$ Å representing free $\alpha\text{-}Fe_2O_3$ were determined.

As clearly understood from the X-ray diffractometry results shown in the above table, example 1 representing the present invention is superior to any of the reference examples A, B and C with respect to intensity at $d=2.56$ Å, while example 1 shows an intensity at $d=2.69$ Å representing free $Fe_2O_3$ below half the levels of the reference examples A, B or C. This obviously means that the ferrite forming reaction of manganese and iron is well furthered in the product according to the present invention.

Although the pellets were calcined by being held at 1,100° C. for 1 hour in the foregoing examples, substantially the same tendency and results were observed when that calcination temperature was held for 2 or 3 hours, or when the calcination temperature was increased to 1,150° C. or 1,200° C.

EXAMPLE 2

Sixteen parts by weight of the same ferromanganese as that used in the aforementioned example 1, 18 parts by weight of zinc oxide of reagent grade 1 subject to the Japanese Pharmacopoeia and 66 parts by weight of the same iron oxide as that used in example 1 were homogeneously mixed. As a binder, 0.1 part by weight of polyvinyl alcohol was added to the mixture to pelletize the same. The resultant pellet particles were about 8 mm across and about 8 mm long. The pellet was placed in a tubular electric furnace and the furnace temperature was raised gradually from room temperature to about 1,200° C. over a period of about 2.5 hours. After maintaining that furnace temperature for an additional 1 hour, the furnace atmosphere was replaced with flowing nitrogen gas and the pellet was left therein to cool down to room temperature.

The thus treated pellet was subjected to powder X-ray diffractometry, which revealed that the ferrite product of the present invention prepared by calcination at 1,200° C. does not show a peak at $d=2.69$ Å representing unreacted $\alpha\text{-}Fe_2O_3$. In contrast, when the calcination temperature of the aforementioned reference examples A, B and C was increased to 1,200° C., peaks of about 5 in terms of relative intensity were observed at $d=2.69$ Å.

As understood from the aforementioned examples, the ferrite forming reaction is accomplished in a substantially shorter time according to the present invention.

What is claimed is:

1. A process for producing ferrites comprising the steps of:
    preparing a mixture of iron oxide powder and ferromanganese powder;
    pelletizing the resultant mixture; and
    calcining the resultant pellet at a temperature of 900° C. or higher to oxidize the pellet.

2. A process for producing ferrites comprising the steps of:
    preparing a mixture of iron oxide powder, ferromanganese powder and at least one component selected from the group consisting of zinc oxide powder, magnesium oxide powder and nickel oxide powder;
    pelletizing the resultant mixture; and
    calcining the resultant pellet at a temperature of 900° C. or higher to oxidize the pellet.

* * * * *